Patented Sept. 12, 1939

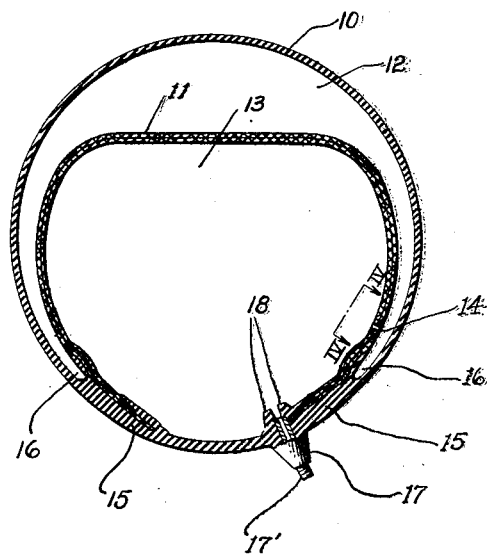
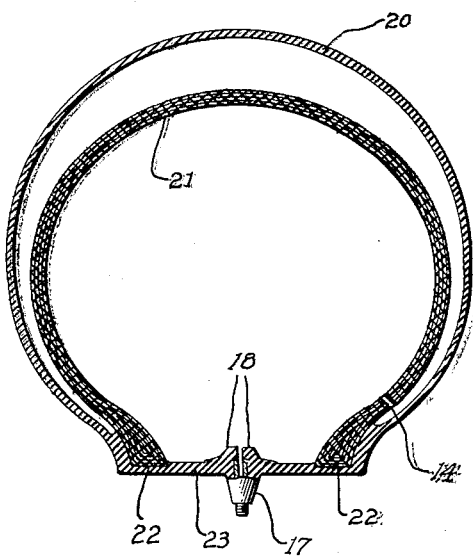
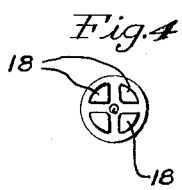

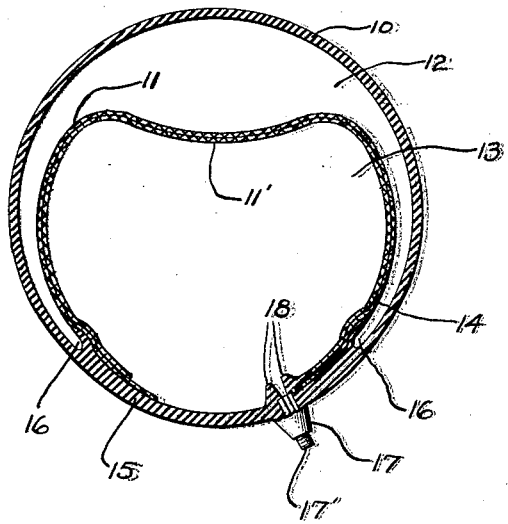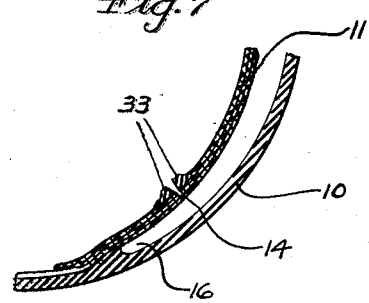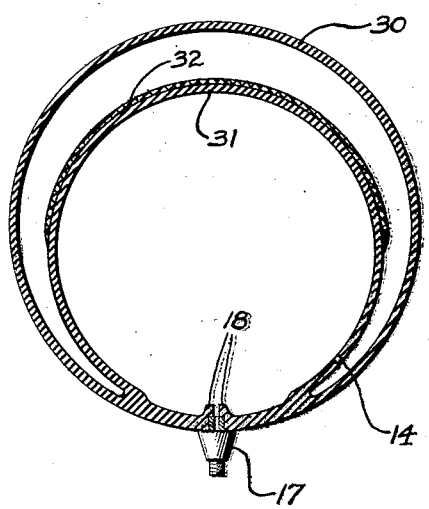

2,173,065

UNITED STATES PATENT OFFICE 2,173,065

SAFETY INNER TUBE FOR PNEUMATIC TIRES

Walter J. Lee, Cuyahoga Falls, Ohio, assignor to Wingfoot Corporation, Wilmington, Del., a corporation of Delaware Application January 19, 1935, Serial No. 2,517

21 Claims. (Cl. 152—342)

This invention relates to improvements in inner tubes for pneumatic tires and it has particular relation to a safety inner tube that will not lose its air rapidly when a blowout occurs.

When a blowout occurs with the type of tube now in general use, the tube quickly loses its air, and on becoming flat subjects the driver of a vehicle to hazards, such as skidding and inability to steer properly, which are particularly dangerous if the vehicle is traveling at high speed. Also, the casing as well as the tube are frequently ruined by running them flat in the time required to stop the vehicle after a blowout.

I have discovered that by providing a tube with a plurality of chambers, two in this instance, having one or more openings communicating between the chambers, that when a blowout occurs the air will leave rapidly from only one of the chambers and the other chamber will lose its air slowly enough to permit the vehicle to be stopped in ample time before the tube becomes flat. With a structure of this type the dangers of blowouts at high speed are minimized if not completely eliminated.

Accordingly, it is an object of this invention to provide a safety inner tube of the type referred to.

Another object is to provide a structure embodying two tubes which may easily be vulcanized together to form two compartments and which may be stabilized by providing a common wall for the tubes in the base portion of the structure.

A further object is to provide a structure wherein the air is admitted through a single valve stem having a restricted opening therein into one of the compartments or tubes and permitted to pass through one or more openings into the other compartment, the valve stem being provided with means protecting the opening therethrough against closure by the wall of the inner of the two tubes when the structure is deflated through the valve stem.

A further object is to provide a structure wherein the inner of the two tubes is formed of a non-stretchable material, such as rubberized cord or woven fabric, and if desired, in a modified form of the structure said tube may be provided with inextensible beads to assist in stabilizing it.

A further object is to provide means for protecting the opening or openings between the compartments against closure by the wall of the inner of the two tubes during deflation.

Other objects and advantages will become apparent from the following description taken in conjunction with the accompanying drawings showing several embodiments of the invention.

In the drawings:

Fig. 1 is a transverse cross section showing one form of the invention,

Fig. 2 is a similar view showing a modified form of the invention,

Fig. 3 is a fragmentary view showing the opening between the two compartments,

Fig. 4 is a plan view of the valve stem showing the protective projections thereon.

Fig. 5 is a transverse cross section showing a further modification of the invention, Fig. 6 is a similar view showing a further modification thereof, and Fig. 7 is a fragmentary cross section of the inner tube showing the protective projections around the opening or openings thereon.

Referring to Figs. 1 and 5 of the drawings, the numeral 10 indicates an outer tube formed of elastic material, such as a rubber compound or the like, while 11 designates an inner tube of smaller size than the outer tube that is arranged in the outer tube so as to form two compartments 12 and 13 which communicate by means of one or more minute substantially radial openings 14 arranged in the wall of tube 11. This opening or openings should preferably be no larger than the size of a pin or small wire forced therethrough to form same.

At the base of the structure, as indicated at 15, a common wall is provided for both tubes which results from circumferentially sealing the two tubes together throughout the base portion of the structure to provide stability and a certain amount of rigidity which could not be obtained if the two tubes were entirely separated or were joined only by means of the valve stem. The base is preferably rubber so that it will easily fit the standard drop center type rim. In forming the seal between the two tubes, which may be accomplished by vulcanizing or in any other suitable manner, fillets 16 are provided to keep the walls of the two tubes as far apart as practical adjacent the sealed portion to prevent separating or tearing of one tube from the other at that point. Preferably, but not necessarily, the opening or openings 14 are located in a stiff part of the tube whereby it or they will remain open when the tube collapses. The location shown in the drawings, slightly above the fillets 16, has been found to be satisfactory and is therefore preferred.

The tube 11 is preferably formed of a non-stretchable material such as rubberized cord or woven fabric which extends well below the fillets on each side to insure maximum restraining action by the fabric. As shown in Fig. 1, the fabric may be built flat across the outer surface to overcome to a considerable degree, the action of centrifugal force which tends to move the outer surface of tube 11 into contact with the inner surface of tube 10 while the structure is rotating on a vehicle. The presence of the opening or openings 14 permits equalized pressure to be maintained in both compartments on opposite sides of tube 11 and the flat condition of the outer surface of this tube will thereby be maintained until a blowout occurs, except for the tendency of centrifugal force to move this surface outwardly. In fact, the tube 11 may be said to float within the tube 10. The flat surface of Fig. 1 may be modified as shown in Fig. 5 whereby a reverse curve or sagging of the fabric as shown at 11' replaces the flat surface and the action of centrifugal force will be overcome to a somewhat greater degree.

A single valve stem 17 is used to inflate and deflate the structure and the opening therein is restricted in any suitable manner to a size of about .025 of an inch whereby air must pass slowly into and out of the structure. The air enters through this stem into compartment 13 and passes into compartment 12 through the opening or openings 14. Preferably a relatively short, stocky valve stem is used which is formed with a metal core 17' surrounded by rubber which is vulcanized to the base of the tube and tapered as shown. Although it is not essential, the valve may be made slightly smaller than the hole in the rim to receive it so that the valve will pull through the hole as the tire becomes flat and not tear off. In deflating the structure through valve 17 the wall of tube 11 is drawn down against the inner end of the valve stem and it is necessary to provide means to prevent this wall from closing the opening in the stem and thereby retard deflation. Hence a plurality of projections 18 are formed on the inner end of the valve stem adjacent the opening therein which prevent the tube wall from closing said opening.

When a blowout occurs in a casing sustained by the tube herein described, the air will quickly leave the compartment 12 and render useless the outer tube 10. However, tube 11 will not be affected by the blowout and its walls will round out due to the pressure in compartment 13 and will support the tire until the air leaks out through the opening or openings 14. The leakage of air from compartment 13 is necessarily slow due to the small size of the opening or openings therein and the vehicle readily may be brought to a stop before the tube is completely flat. Thus a safety feature is made possible by my tube which is of great benefit to the drivers of automobiles and other vehicles using pneumatic tires.

It is to be noted that in the event a blowout should occur in the portion of the structure around the base so that the air would first escape from compartment 13, the safety feature would still be present because the air in compartment 12 would support the tire at least long enough to bring the vehicle to a stop before all the air escaped.

Any suitable method may be used in building the structure and I have described and claimed one method in my co-pending application, Serial No. 4,691, filed February 2, 1935, now Patent No. 2,090,210, granted August 17, 1937.

In Fig. 2 I have shown a modified structure wherein the outer tube 20 is formed of elastic material similar to that used in tube 10, and the inner tube 21 is formed of rubberized cord or woven fabric similar to tube 11, but inextensible beads 22, similar to the customary tire beads, are incorporated with the plies to stabilize and stiffen the structure. A common base 23 is also provided for the two tubes in this form of the invention.

Fig. 6 shows a further modification wherein the rubber structure of Fig. 3 has the inner tube 31 reinforced by a fabric crown 32 which acts to stiffen tube 31.

Fig. 7 shows the opening or openings 14 protected against closure by the walls of the inner tube through the provision of a plurality of projections 33 similar to the projections 18 on the valve stem.

It will be obvious that many changes could be made in the structures shown within the scope of this invention. For example, a conventional metal grommet could be used with the opening or openings 14 to insure a free opening at all times. Also it is possible to use a conventional valve in the opening or openings 14 which is adapted to close the opening whenever a pressure differential of say 10 pounds or more exists between the compartments 12 to 13. With such a valve it would even be possible to retain the air within the compartment 13 for a longer time because the valve would operate to close the opening 14 as soon as the compartment 12 blows out.

It is believed to be apparent that I have invented a novel tube structure which is well adapted for the purposes intended and which will serve to prevent many accidents formerly caused by blowouts.

Although I have illustrated several forms of the invention and have described those forms in detail it will be apparent to those skilled in the art that the invention is not so limited, but that various modificaions may be made therein without departing from the spirit of the invention or from the scope of the sub-joined claims.

I claim:

1. A safety tube for pneumatic tires comprising an outer wall, a base wall, and an intermediate wall united together adjacent to bead-engaging zones throughout their peripheral extent and defining plural annular chambers, one within the other, said outer wall being extensible and adapted to contact the major interior portion of a tire, said intermediate wall being substantially inextensible lengthwise and flexible and having a restricted communication port providing for equalization of inflation pressure within the plural chambers and providing for slow deflation of one chamber in the event of puncturing of the other chamber, and said base wall being readily deformable and of sufficient width to facilitate mounting and dismounting with reference to a tire and rim, and said base wall being adapted to contact the beads of a tire and to be held against the same by pressure in the inner chamber, and means through which air may be supplied to said tubes.

2. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, in a lengthwise direction, at least at the outer peripheral portion thereof, whereby the lengthwise dimension of the said inner tube is not increased materially under the stress of centrifugal force, means through which air may be supplied to said tubes, and pressure equalizing means providing for the restricted flow of inflating medium from one tube to the other.

3. An inflatable fluid container adapted to be inserted in and removed from a tire casing as a unit, comprising a flexible annular tube arranged within a second flexible annular tube of greater cross-section, said tubes being joined along their rim-adjacent areas throughout substantially their entire peripheries, the remaining disjoined portions of said tubes when properly inflated being free of and spaced from each other under normal service conditions, the inner one of said tubes being substantially inextensible, in a lengthwise direction, throughout the extent of the entire free portion thereof, whereby the lengthwise dimension of the said inner tube is not increased materially under the stress of centrifugal force, means through which air may be supplied to said tubes, and pressure equalizing means providing for the flow of inflating medium from one tube to the other during normal operation.

4. An inflatable fluid container adapted to be inserted in and removed from a tire casing as a unit, comprising a flexible annular tube arranged within a second flexible annular tube of greater cross-section, said tubes being joined along their rim-adjacent areas throughout substantially their entire peripheries, the remaining disjoined portions of said tubes when properly inflated being free of and spaced from each other under normal service conditions, the inner one of said tubes being substantially inextensible, in a lengthwise direction, throughout the entire free portion thereof and a contiguous portion of the joined areas, whereby the lengthwise dimension of the said inner tube is not increased materially under the stress of centrifugal force, means through which air may be supplied to said tubes, and pressure equalizing means providing for the flow of inflating medium from one tube to the other during normal operation.

5. An inflatable fluid container adapted to be inserted in and removed from a tire casing as a unit, comprising a flexible annular tube arranged within a second flexible annular tube of greater cross-section, said tubes being joined peripherally and transversely throughout substantially their entire rim-adjacent areas, the remaining disjoined portions of said tubes when properly inflated being free of and spaced from each other under normal service conditions, the inner one of said tubes being substantially inextensible, in a lengthwise direction, at least at the outer peripheral portion thereof, whereby the lengthwise dimension of the said inner tube is not increased materially under the stress of centrifugal force, means through which air may be supplied to said tubes, and pressure equalizing means providing for the flow of inflating medium from one tube to the other during normal operation.

6. An inflatable fluid container adapted to be inserted in and removed from a tire casing as a unit, comprising a flexible annular tube arranged within a second flexible annular tube of greater cross-section, said tubes being joined along their base areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the base portion of said container being stretchable to an appreciable extent at least transversely.

7. An inflatable fluid container adapted to be inserted in and removed from a tire casing as a unit, comprising a flexible annular tube arranged within a second flexible annular tube of greater cross-section, said tubes being joined along their base areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the base portion of said container being a layer of stretchable rubber.

8. An inflatable fluid container adapted to be inserted in and removed from a tire casing as a unit, comprising a flexible annular tube arranged within a second flexible annular tube of greater cross-section, said tubes being joined along their base areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the outer periphery of said inner tube being normally substantially flat transversely.

9. An inflatable fluid container adapted to be inserted in and removed from a tire casing as a unit, comprising a flexible annular tube arranged within a second flexible annular tube of greater cross-section, said tubes being joined along their base areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the outer periphery of said inner tube being substantially concave transversely.

10. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to at least one of said tubes, said container having a relatively small port forming a communicating passage between said tubes whereby to equalize the pressures in said tubes under normal operating conditions and whereby when either tube is ruptured air will leak out slowly from the other of said tubes.

11. An inflatable fluid container adapted to be inserted in and removed from a tire casing as a unit, comprising a flexible annular tube arranged within a second flexible annular tube of greater cross-section, said tubes being joined along rim adjacent areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the wall of said inner tube being provided with a port of small diameter forming a communicating passage between said tubes to equalize the pressures therein.

12. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, at least in a peripheral direction, at least at the outer peripheral portion thereof, whereby the lengthwise dimension of the said inner tube is not increased materially under the stress of centrifugal force, and means through which air may be supplied to said tubes, the adjacent walls of said tubes at their point of juncture with the joined rim adjacent areas being connected by a fillet to hold the walls separated near the base, and said inner tube being provided with a relatively small port in a portion thereof near said fillet to equalize the pressures in said tubes.

13. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, at least in a lengthwise direction, throughout the extent of the entire free portion thereof, whereby the lengthwise dimension of the said inner tube is not increased materially under the stress of centrifugal force, and means through which air may be supplied to said tubes, the inner tube at its rim adjacent area being provided with annular substantially inextensible beads to which the inextensible portion of said tube is anchored.

14. An inflatable fluid container adapted to be inserted in and removed from a tire casing as a unit, comprising a flexible annular tube arranged within a second flexible annular tube of greater cross-section, said tubes being joined at at least laterally opposite sides of their rim adjacent areas throughout substantially their entire peripheries, the remaining disjoined portions of said tubes outwardly of the joined portions, when properly inflated, being substantially free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, means through which air may be supplied to said tubes, and pressure equalizing means providing for the flow of inflating medium from one tube to the other during normal operation.

15. An inflatable fluid container adapted to be inserted in and removed from a tire casing as a unit comprising a flexible annular outer tube adapted when inflated to fill a tire casing and defining a continuous annular outer chamber terminating adjacent the beads at the opposite sides of the tire casing, a flexible rim adjacent base wall portion sufficiently wide to engage the beads of the tire casing and joining the outer tube in its bead adjacent areas, a circumferentially inextensible inner tube of smaller outside diameter formed at its inner periphery by said base wall portion and defining a continuous annular inner chamber adapted when inflated to hold the base wall portion against the tire beads independently of the pressure existing in the outer chamber, an inflation valve on said base wall portion opening into the inner tube, and pressure equalizing means providing for the flow of inflating medium from one tube to the other during normal operation.

16. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, in a lengthwise direction, at least at the outer peripheral portion thereof, whereby the lengthwise dimension of the said inner tube is not increased materially under the stress of centrifugal force, means through which air may be supplied to said tubes, and pressure equalizing means providing for the flow of inflating medium from one tube to the other during normal operation.

17. An inflatable fluid container adapted to be inserted in and removed from a tire casing as a unit, comprising a flexible annular tube arranged within a second flexible annular tube of greater cross-section, said tubes being joined along their rim adjacent areas throughout substantially their entire peripheries, the remaining disjoined portions of said tubes when properly inflated being free of and spaced from each other under normal service conditions, the inner one of said tubes being substantially inextensible, at least in a lengthwise direction, at least at the outer peripheral portion thereof, whereby the lengthwise dimension of the said inner tube is not increased materially under the stress of centrifugal force, and means through which air may be supplied to said tubes, the substantially inextensible portion of the inner tube being anchored to substantially inextensible beads at the opposite sides of said inner tube to counteract the action of centrifugal force tending to move the inextensible portion radially outward.

18. An inflatable fluid container adapted to be inserted in and removed from a tire casing as a unit, said container comprising an outer flexible tube adapted alone to support the tire casing under normal service conditions, and an inner flexible tube of smaller cross-section disposed within the outer tube and adapted only to afford temporary support to the tire casing under emergency conditions brought about by the failure of the outer tube, the two tubes being united around their inner peripheral portions to maintain them in concentric relation to each other, said union of the two tubes being within the rim area to leave the outer tube free to flex under normal service conditions without restraint by or effect upon the inner tube, and the inner tube being substantially inextensible, at least along its outer peripheral portion, so as to resist the action of centrifugal force which tends to expand it circumferentially under normal service conditions, together with means for establishing communication between the two tubes which means, under normal service conditions, provide for the equalization of the inflation pressure within the two tubes to maintain the inner tube fully inflated and yet free of the load carrying burden of the outer tube and which means, under emergency conditions, provide for the slow deflation of the inner tube to impose the load carrying burden upon it only during the emergency period.

19. An inflatable fluid container adapted to be inserted in and removed from a tire casing as a unit, said container comprising an outer flexible tube adapted alone to support the tire casing under normal service conditions, and an inner flexible tube of smaller cross-section disposed within the outer tube and adapted only to afford temporary support to the tire casing under emergency conditions brought about by the failure of the outer tube, the two tubes being united around their inner peripheral portions to maintain them in concentric relation to each other, said union of the two tubes being within the rim area to leave the outer tube free to flex under normal service conditions without restraint by or effect upon the inner tube, and the inner tube being substantially inextensible throughout its free or disunited portion to resist expansion either by the action of centrifugal force under normal service conditions or by the internal pressure of the inflating medium under emergency conditions, together with means for establishing communication between the two tubes which means, under normal service conditions, provide for the equalization of the inflation pressure within the two tubes to maintain the inner tube fully inflated and yet free of the load carrying burden of the outer tube and which means, under emergency conditions, provide for the slow deflation of the inner tube to impose the load carrying burden upon it only during the emergency period.

20. An inflatable fluid container adapted to be inserted in and removed from a tire casing as a unit, said container comprising an outer flexible tube adapted alone to support the tire casing under normal service conditions, and an inner flexible tube of smaller cross-section disposed within the outer tube and adapted only to afford temporary support to the tire casing under emergency conditions brought about by the failure of the outer tube, the two tubes being united around their inner peripheral portions to maintain them in concentric relation to each other, said union of the two tubes being within the rim area to leave the outer tube free to flex under normal service conditions without restraint by or effect upon the inner tube, and the inner tube being substantially inextensible throughout its free or disunited portion to resist expansion either by the action of centrifugal force under normal service conditions or by the internal pressure of the inflating medium under emergency conditions, but being extensible with the outer tube along their united portions so as to fill the well of a drop center rim, together with means for establishing communication between the two tubes which means, under normal service conditions, provide for the equalization of the inflation pressure within the two tubes to maintain the inner tube fully inflated and yet free of the load carrying burden of the outer tube and which means, under emergency conditions, provide for the slow deflation of the inner tube to impose the load carrying burden upon it only during the emergency period.

21. For a pneumatic tire, an inner tube, a safety tube of substantially non-stretchable material disposed within the inner tube, said tubes being connected together along their inner peripheries; said safety tube having one or more vent openings therein; and means for inflating the inner and safety tubes.

WALTER J. LEE.